United States Patent [19]

Ueda

[11] Patent Number: 5,012,410
[45] Date of Patent: Apr. 30, 1991

[54] DATA PROCESSOR WITH INSTRUCTION CACHE MEMORY

[75] Inventor: Tatsuya Ueda, Itamishi, Japan

[73] Assignee: Mitsubishi Denki Kabushiki Kaisha, Tokyo, Japan

[21] Appl. No.: 227,290

[22] Filed: Aug. 2, 1988

[30] Foreign Application Priority Data

Aug. 5, 1987 [JP] Japan ................................ 62-196805

[51] Int. Cl.$^5$ .............................................. G06F 13/00
[52] U.S. Cl. ................................ 364/200; 364/243.41; 364/271.6
[58] Field of Search ... 364/200 MS File, 900 MS File

[56] References Cited

U.S. PATENT DOCUMENTS 4,317,168 2/1982 Messina et al. ..................... 364/200
4,366,540 12/1982 Berglund et al. ................... 364/200
4,467,419 8/1984 Wakai ................................ 364/200

OTHER PUBLICATIONS

IEEE Spectrum, 12/87, "Cache Memory Design; an Evolving Art".

Primary Examiner—Eddie P. Chan
Attorney, Agent, or Firm—Townsend and Townsend

[57] ABSTRACT

Conventional microprocessors access cache memory and external memory using a common data bus and share a single program counter. According to this invention, the cache memory and the external memory have corresponding program counters and separate data buses. The capacity to update the cache memory program counter concurrently with a cache memory access increases the speed of data processing.

8 Claims, 3 Drawing Sheets

DATA PROCESSOR WITH INSTRUCTION CACHE MEMORY

BACKGROUND OF THE INVENTION

This invention relates to a microprocessor which has an internal cache memory and particularly to the implementation of high speed cache access in the microprocessor.

High levels of chip integration accompanying recent rapid advances in LSI manufacturing technology has made it possible to increase the processing speed of microprocessors by placing on the microprocessor chip high speed instruction execution devices such as pipeline processing formerly used only by mainframe computers.

The operating speed of the external memory, where data the microprocessor needs is stored, already cannot keep up with the speed of the microprocessor. Now that high speed instruction execution devices are being integrated with the microprocessor, the operating speed of the external memory has become a bottleneck.

Microprocessor data access can be accelerated by placing a cache memory, a high speed memory device, between the microprocessor and the former external memory and entering frequently used data from the external memory into the cache memory. Moreover, we can use high integration LSI technology to put the cache memory within the microprocessor itself so that instructions can be entered into the microprocessor even more rapidly.

FIG. 3 is a block diagram of a conventional microprocessor which contains a cache memory. The microprocessor 11 is connected to an external memory 12, which stores data the microprocessor 11 needs. A program counter 13, an address bus 14, an address latch 15 and a cache memory M are also shown in FIG. 3. Multiple addresses are stored in an associative memory unit 16 (hereinafter CAM unit). If an address identical to the address outputted by an address latch 15 is registered, or set, in the CAM unit 16 a match signal corresponding to that address is output on a match line 17. A match signal latch 18 latches the match signal output from the CAM unit 16 on the match line 17. A data memory unit 19 (hereinafter the RAM unit) stores data corresponding to match signals. Data stored in the RAM unit can be accessed through match signals output from a match signal latch 18 on a word line 20. Data which is an output result of a cache memory M is output to a data latch 21. FIG. 3 also shows a data bus 22.

FIG. 4 is a timing chart for the clock signal which determines when the microprocessor 11 performs a reference operation to the cache memory M. Phase A and phase B of FIG. 4 are non-overlapping two phase clock signals.

First, during phase A, the address latch 15 latches the address on the address bus 14 while simultaneously referencing the CAM unit 16 at that address in order to determine if the identical address is registered in the CAM unit 16. If an identical address has been registered, then a corresponding match signal is output on the match line 17. Moreover, during this same phase A, a reference to this same address can be performed on the external memory unit 12.

Next, during phase B, the match signal latch 18 latches the match signal. Concurrently, the match line 17, which is the match line of the match signal latch 18, accesses RAM unit 19 through the word line 20.

During the second phase A, the data latch 21 latches the output results of the cache memory M and decides whether or not the output results are valid.

If the data is valid, the current access to the external memory 12 is canceled and the program counter 13 is incremented to the next reference operation.

If the data is invalid or if the CAM unit 16 does not contain an identical address, the results of the current access to the external memory 12 are needed. Therefore the microprocessor waits until the access to the external memory 12 has been completed before going on to the next reference operation.

The conventional microprocessors such as described above cannot update the contents of the address bus during an instruction fetch before the results of the cache access are output because the cache memory M and the external memory 12 share the address bus 14. Thus the long sequence of events requiring that when the cache memory M is hit, data must first be determined to be valid before the program counter 13 is incremented degrades the efficiency of the access which might begin at the next phase A.

SUMMARY OF THE INVENTION

It is an object of this invention to provide a microprocessor capable of performing high speed data processing by eliminating the address update period while data is being read from the external memory or from the cache memory.

According to this invention, separate registers are used to update addresses in the external memory and in cache meory. Moreover, separate data bus systems are used between the register and the external memory and between the register and the cache memory. Thus, processing speed may be increased by updating the address on the cache memory register when the address corresponding to the cache memory is output.

DESCRIPTION OF THE PREFERRED EMBODIMENT

Figure 1:
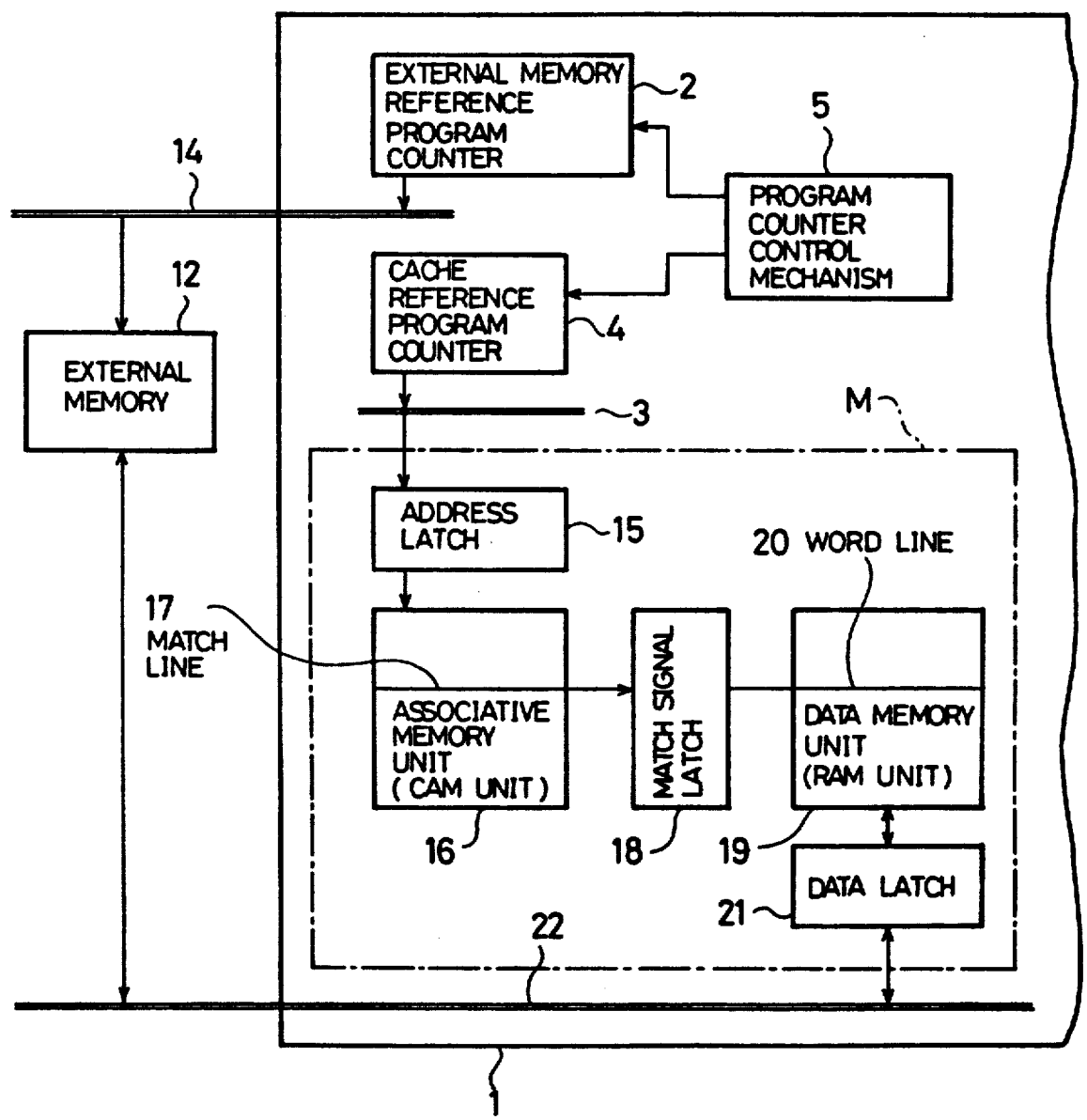
FIG. 1 is a block diagram of a microprocessor according to an embodiment of this invention.
Figure 3:
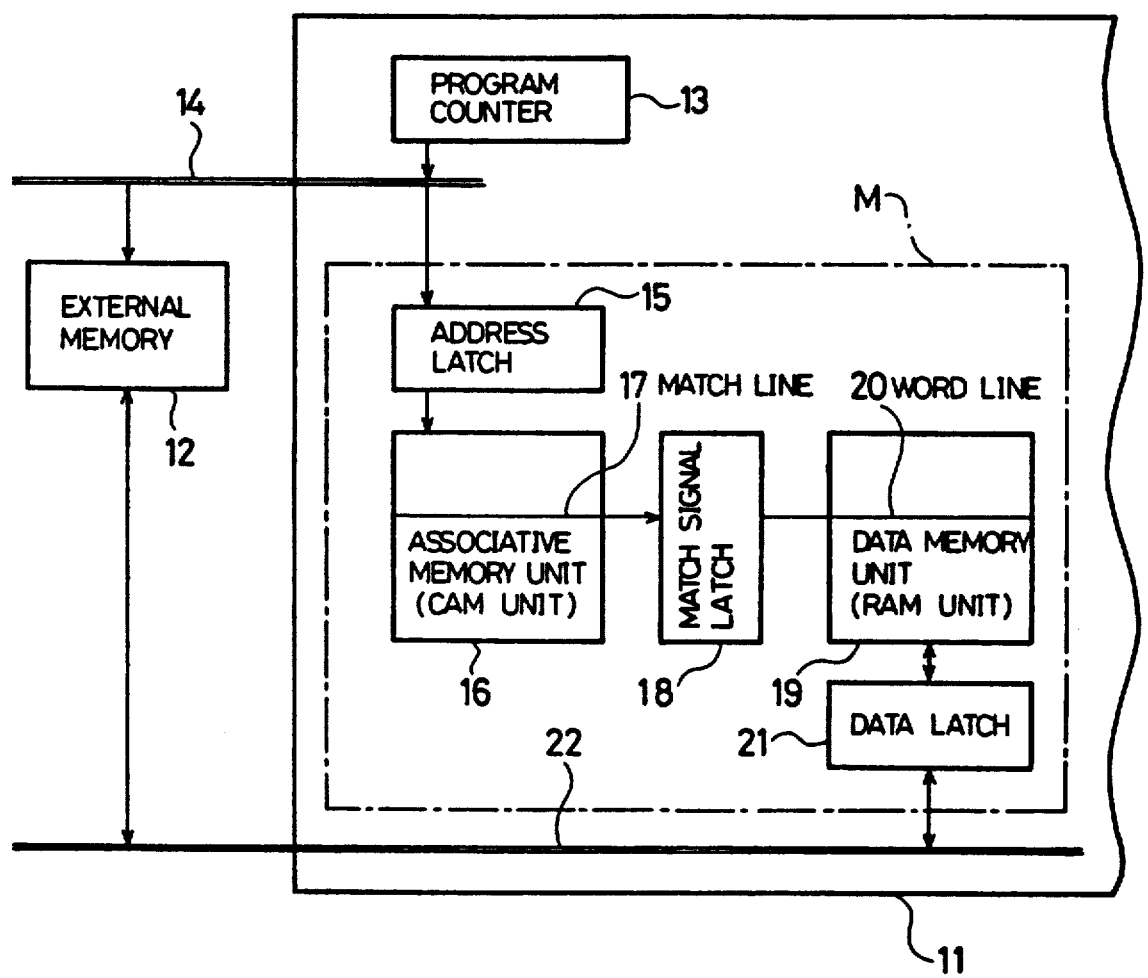
FIG. 3 is a block diagram of a conventional microprocessor.

FIG. 1 shows a microprocessor embodying this invention. Components identical with those of FIG. 3 are assigned the same reference numerals as they have in FIG. 3. A microprocessor 1 includes a cache memory M and other devices on the same chip. An external memory reference program counter 2, which serves as the first register of this invention, outputs addresses to the external memory 12 through the address bus 14. A cache memory address bus 3 passes on addresses from the cache memory M. A cache reference program counter 4, which serves as the second register of this invention, outputs addresses to the cache memory M through the cache address bus 3. A program counter control mechanism 5, which serves as the control device of this invention, points to the address outputted by the cache reference program counter 4 and to the address output by the external memory reference program counter 2.

Next, the cache memory M reference operations of the microprocessor 1 of this invention will be described with reference to the flowchart of FIG. 2 in which steps (1) to (12) are shown.

Figure 4:
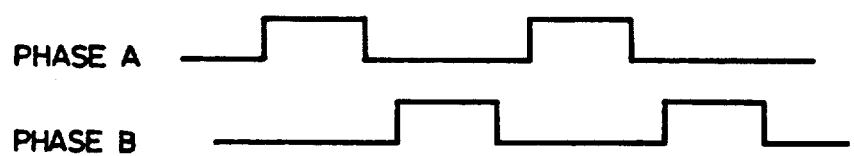
FIG. 4 is a timing chart of the clock signals which provide for cache memory reference operations.

The cache memory M is operated in the microprocessor of this invention, as in conventional microprocessors, by the non-overlapping two phase clock signals phase A and phase B shown in FIG. 4.

First, during phase A, the address latch 15 latches the address on the cache address bus 3 while concurrently referencing the same address at the CAM unit 16 in order to determine if an identical address has been registered in the CAM unit 16 (step 1). If an identical address is found registered in the CAM unit 16 at this time, then a corresponding match signal is output on the match line 17. Moreover, during this same phase A, a reference to external memory 12 is also performed using address bus 14 (step (2)).

Next, during phase B, at the same time the match signal latch 18 latches a match signal, the match signal latch 18 uses its match line 17 as word line 20 to access the RAM unit 19 (step (3)).

During phase A described above, the external memory reference program counter 2 and the cache reference program counter 4 have the same value. However, even if the cache memory M is not hit between the reads of phase A and phase B described above, the program counter control mechanism 5 increments the cache reference program counter 4. This new value is output to cache address bus 3 until the next phase A (step (4)).

Then, during the next phase A, the data latch 21 latches the read result of the RAM unit 19, which has assumed the same value as the read result of cache memory M. Concurrently, a new cache access begins (step (5)). In this case, the results of the previous read and the data hit by the CAM unit 16 are checked to determine if they are valid (step (6)). If they are valid, jumps are made to steps (3) and (7) and the next phase B read operation can be performed. Concurrently, the external memory access is canceled (step (7)), the external memory reference address is updated (step (8)), and a new external memory access (step (2)) is performed.

If there is no hit, or if the hit data is invalid, the newly initiated cache access cycle is canceled by jumping to step (10) and waiting for the termination of the external memory access (step (11)), and data is entered from the external memory 12 (step (12)).

Thus, according to this invention, before determining the validity of the read results at the second phase A, the cache memory is hit in order to increment the cache reference program counter 4. If the hit produces valid data, then the next read can begin immediately at the next phase A and the processing speed during cache reference increases.

Moreover, according to this invention, the reference operations to cache memory M occur essentially concurrently with reference operations to the external memory 12. However, in some cases, the address bus 14 is already busy and the external memory 12 cannot be accessed concurrently with the cache memory M. In such cases, no access is performed to the external memory 12 and the results of the cache memory reference are awaited. If a hit is made on the cache, then it is unnecessary to perform an access operation on the external memory 12. If no hit in made on the cache, then the external memory is referenced once again using the same address.

Figure 2:
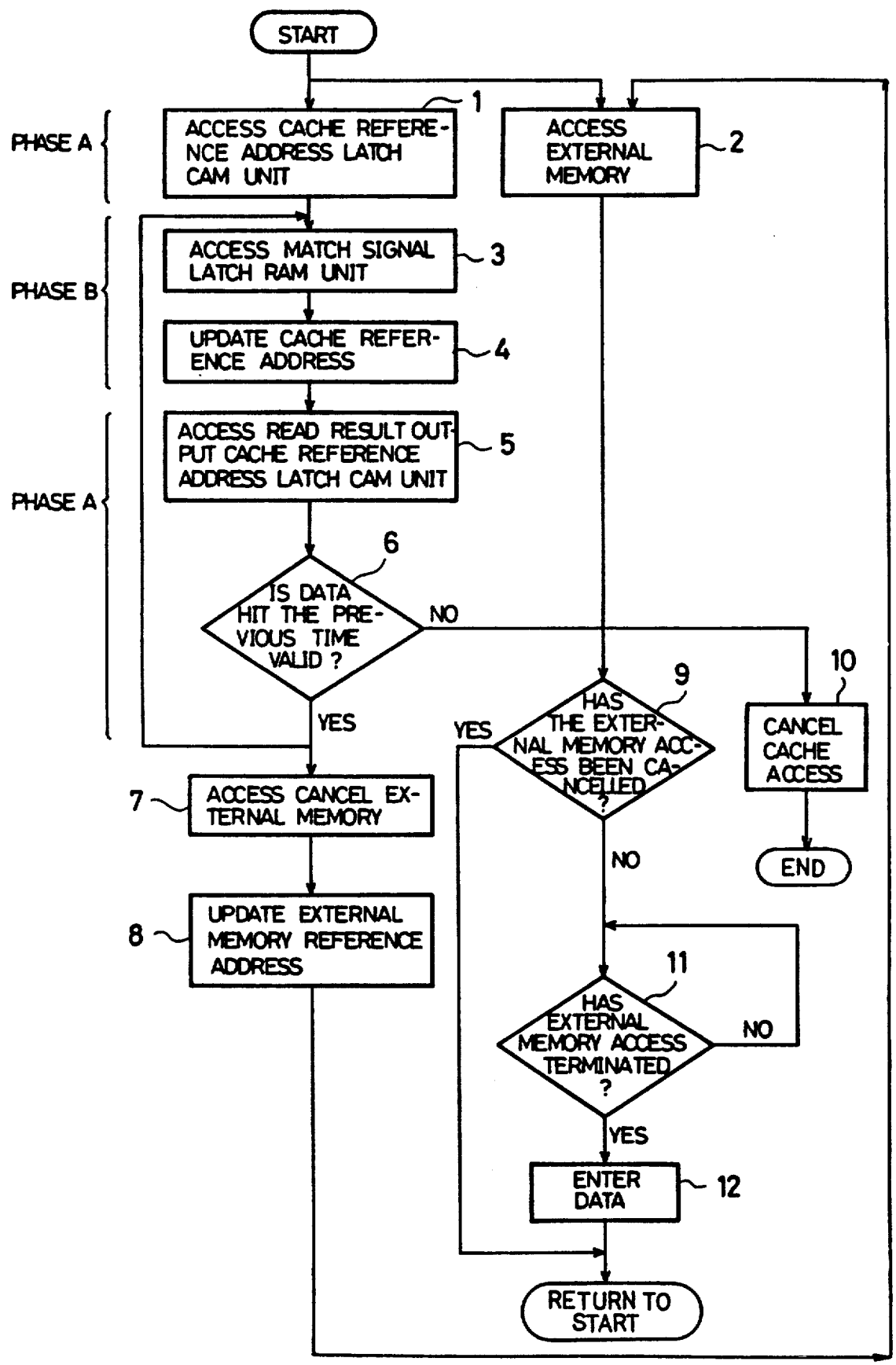
FIG. 2 is a flowchart which explains the memory reference operations of the microprocessor according to this invention.

Although the flowchart of FIG. 2 shows that the increment (address update) of the cache reference program counter 4 occurs during the latter half of phase B, this invention does not restrict the increment to this time. Naturally, the increment could also occur during the first half of phase A.

What is claimed is:

1. A microprocessor system having a microprocessor and coupled to an external memory comprising:
   a first address bus for transmitting an address to the external memory;
   a first register coupled to said first address bus for outputting the address to said first address bus;
   a cache for storing a plurality of addresses and a corresponding plurality of data;
   a second address bus, coupled to said cache, for transmitting the address to said cache;
   a second register, coupled to said second address bus, for outputting the address to said second address bus;
   a data bus, coupled to said external memory and to said cache, for transmitting data between said external memory and said microprocessor;
   a third register, coupled to said cache and to said data bus, for transmitting data between said data bus and said cache memory;
   means, coupled to said first and second registers, for issuing a control signal wherein said control signal updates a contents of said second register, with a next address during a cache read of a previous address while maintaining a content of said first register for data being read from said cache and begins a cache read of said next address using an updated contents of said second register once a data stored at said previous address is output from said cache to said third register.

2. The microprocessor of claim 1, wherein said first register and said second register are program counters.

3. The microprocessor system of claim 1, wherein when a first cache access and an external memory access are performed during a first phase of a first non-overlapping two phase clock signal, the content of said second register of said cache memory is updated before said cache memory is accessed in a first phase of a second non-overlapping two phase clock signal.

4. A microprocessor system comprising:
   a first memory;
   a cache;
   a first address bus, coupled to said first memory, for transmitting an address to said first memory;
   a first address register coupled to said first address bus for outputting the address to said first address bus;
   a second address bus, coupled to said cache, for transmitting the address to said cache;
   a second address register coupled to said second address bus for outputting the address to said second address bus;
   means, coupled to said first and second address registers, for issuing a control signal for updating a content of said second register while maintaining a content of said first register such that during a cache read of a datum located at a first address, the content of said first address register corresponds to said first address and the content of said second address register corresponds to a next address.

5. The microprocessor system of claim 4 wherein said control unit issues a signal which initiates a cache read of a datum located at said next address once the data located at said previous address has been read from said cache.

6. A microprocessor system that receives a first and second dual phase clock signal comprising:
- a first latch, coupled to said first dual phase clock signal and to a cache memory address bus, for latching a first address carried by said cache memory address bus into a cache memory address table when a first phase of said first dual phase clock signal is asserted;
- an external memory reference program counter, coupled to said first dual phase clock signal and to an external memory address bus, which places the first address on said external memory address bus when a first phase of said first dual phase clock is asserted;
- a match signal latch, coupled to said cache memory address table, a cache memory and said second dual phase clock signal, which latches said first address from said cache memory address table into said cache memory during a first phase of said second dual phase clock signal when said cache memory address table issues a match signal during the first phase of the first dual phase clock signal;
- a data latch, coupled to said cache memory random access memory, a data bus and said first dual phase clock signal, which latches a data read from said cache memory random access memory at said first address onto a data bus during said second phase of said first dual phase clock signal;
- a cache reference program counter, coupled to said cache memory address bus and said first and second dual phase clock signals, which places the first address on the cache memory address bus during the first phase of the first dual phase clock signal, and which during the first phase of the second dual phase clock signal places an updated address on said cache memory address bus; and
- means, coupled to said first and second dual phase clock signals and to said external memory reference program counter, for maintaining said first address in said external memory reference program counter during said first phase of the second dual phase clock signal.

7. A method for operating a microprocessor system having a cache and external memories and which receives a first and second dual phase clock signals, comprising the steps of:
- latching a first address contained on a cache memory address bus into a cache memory address table during a first phase of the first dual phase clock signal;
- placing said first address on an external memory bus during the first phase of said first dual phase clock signal;
- latching said first address from said cache memory address table into said cache memory during a first phase of said second dual phase clock cycle;
- placing an updated address on said cache address bus during the first phase of said second dual phase clock signal;
- latching a datum read from said cache memory at said first address onto a data bus during a second phase of said first dual phase clock signal; and
- maintaining said first address on said external memory bus during said first phase of the second dual phase clock signal.

8. The method for operating a microprocessor system of claim 7 further comprising the steps of:
- determining, during the second phase of the first dual phase clock cycle, if said datum retrieved from said cache memory is valid;
- terminating an accessing of said external memory and placing said updated address on said external address bus if said datum is valid; and
- reading a datum located at said first address from the external memory if the datum retrieved from said cache memory is invalid.

* * * * *